United States Patent [19]
Rodriguez

[11] Patent Number: 5,987,865
[45] Date of Patent: Nov. 23, 1999

[54] UNDERWATER SENSING APPARATUS AND METHOD

[76] Inventor: Linda Rodriguez, 147 Montrose Ave., South Plainfield, N.J. 07080

[21] Appl. No.: 09/187,877

[22] Filed: Nov. 9, 1998

[51] Int. Cl.[6] .................................................. A01D 7/00
[52] U.S. Cl. .............................. 56/400.01; 43/4.5; 43/1
[58] Field of Search .............................. 43/1, 4, 4.5, 137; 452/146; D22/121, 149, 150; 7/106, 170, 167, 115; D8/DIG. 7; 294/49, 55.5; 56/400.01

[56] References Cited

U.S. PATENT DOCUMENTS

| | | | |
|---|---|---|---|
| D. 25,841 | 7/1896 | Bonte . | |
| D. 235,304 | 6/1975 | Greenberg | D7/101 |
| 1,920,954 | 8/1933 | Benedict . | |
| 2,480,924 | 9/1949 | Heger | 43/4 |
| 2,891,814 | 6/1959 | Idoine et al. . | |
| 3,581,651 | 6/1971 | Johnson | 99/254 |
| 4,190,279 | 2/1980 | Sguazzin | 294/49 |
| 5,014,921 | 5/1991 | Skerker et al. | 241/169.2 |
| 5,617,605 | 4/1997 | Joerner et al. | 15/105 |
| 5,799,998 | 9/1998 | Gitterman, III | 294/59 |

*Primary Examiner*—Jack W. Lavinder
*Attorney, Agent, or Firm*—Walter J. Tencza, Jr.

[57] ABSTRACT

An apparatus and method for sensing objects under water, such as fish or clams, is provided. First and second handles attached to a base are provided. A plurality of protrusions are attached to the base and protrude from the base. The first and second handles are part of first and second rigid members. The first and second rigid members are preferably elongated and each have a top and a bottom. The first and second handles lie at the top of the first and second rigid members. The base is preferably connected to the bottom of the first and second rigid members. The base preferably is more densely weighted than the first rigid member and more densely weighted than the second rigid member. The base, and first and second rigid members may have a plurality of openings which allow water to pass through. The first and second handles may have outer shapes comprised of first and second curves. The first curve may have substantially lesser curvature than the second curve to provide a handle and to provide an easy to maneuver and lightweight apparatus.

20 Claims, 2 Drawing Sheets

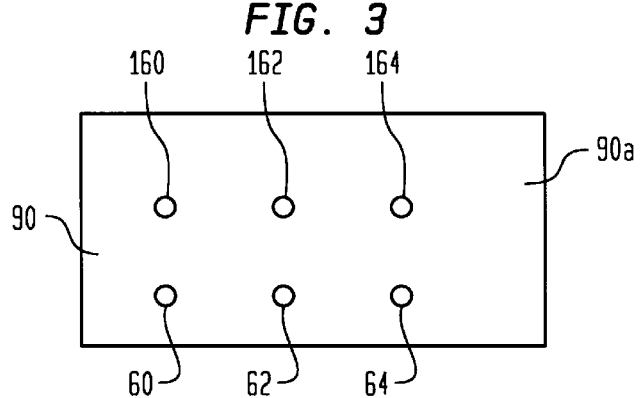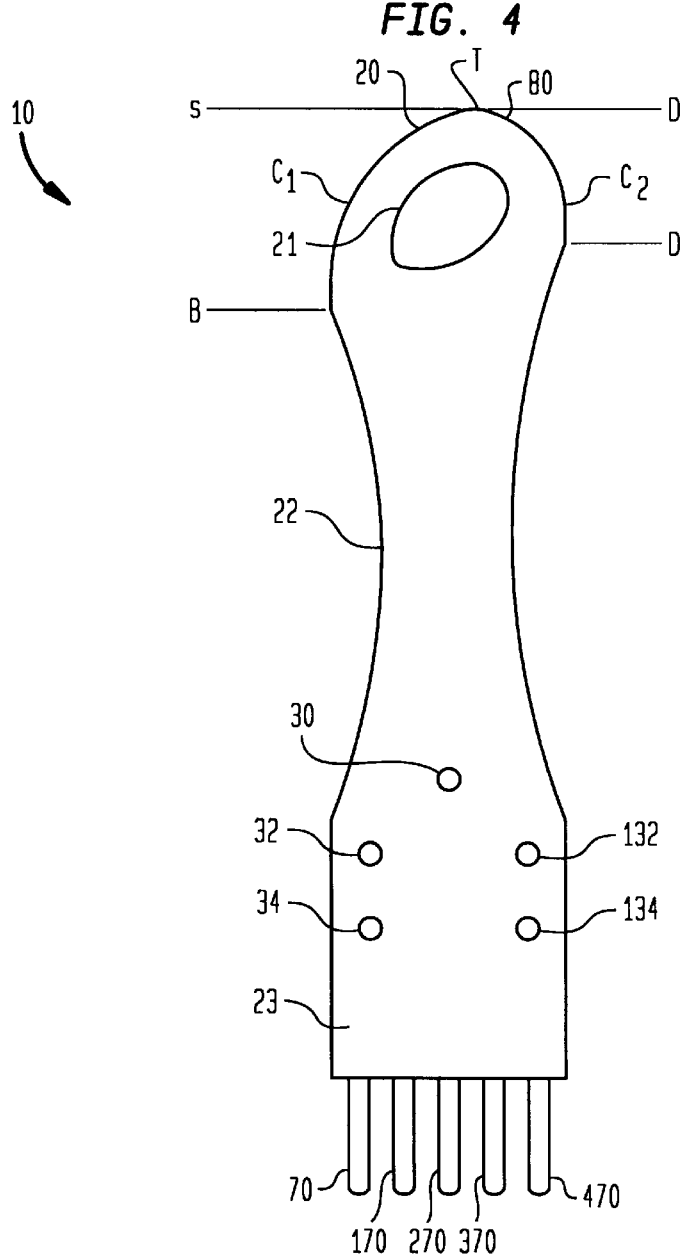

UNDERWATER SENSING APPARATUS AND METHOD

FIELD OF THE INVENTION

This invention relates to improved methods and apparatus for sensing fish, clams, or other objects under water without using one's hands or feet.

BACKGROUND OF THE INVENTION

It is difficult to sense objects under water. For example, in trying to find clams one has to stoop over and feel around with one's hands under water. This is a slow and tedious process. One may also need to dig under water or to feel with one's feet. Better methods and apparatus for sensing objects under water, such as clams are needed.

SUMMARY OF THE INVENTION

The present invention in some embodiments provides an improved apparatus and method for sensing objects, such as fish or clams, under water. The apparatus in one embodiment is comprised of a first and second handles attached to a base. A plurality of protrusions are attached to the base and protrude from the base. The first and second handles are preferably part of first and second rigid members. The first and second rigid members are preferably elongated and each have a top and a bottom. The first and second handles preferably lie at the top of the first and second rigid members. The base is preferably connected to the bottom of the first and second rigid members. The base preferably is more densely weighted than the first rigid member and more densely weighted than the second rigid member. The base, and first and second rigid members may have a plurality of openings which allow water to pass through. The first and second handles may have outer shapes comprised of first and second curves. The first curve may have substantially lesser curvature than the second curve to provide a handle and to provide a balanced and lightweight apparatus.

BRIEF DESCRIPTION OF THE DRAWINGS

FIG. 3 shows a top view of the base only of the apparatus of FIG. 1; and

FIG. 4 shows a side view of the apparatus of FIG. 1.

DETAILED DESCRIPTION OF THE DRAWINGS

Figure 1:
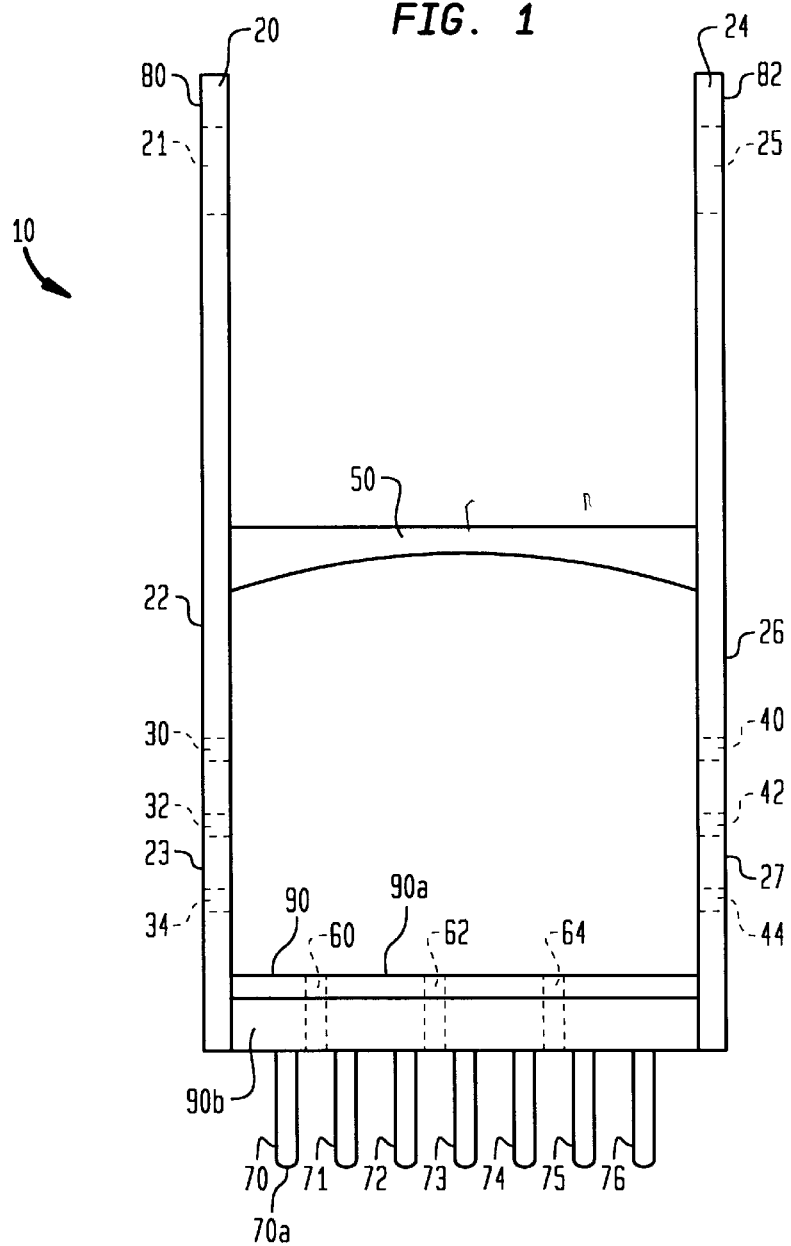
FIG. 1 shows a front view of an underwater sensing apparatus in accordance with an embodiment of the present invention.

FIG. 1 shows a front view of an underwater sensing apparatus 10 in accordance with an embodiment of the present invention. The underwater sensing apparatus 10 includes left rigid member 80, right rigid member 82, base 90, connecting member 50, and protrusions 70–76. The entire apparatus 10 may be made of aluminum, plastic, or any lightweight rustproof material. Preferably the apparatus 10 is weighted towards the bottom portion (i.e. towards the base 90). The base 90 can be a heavier material or the base 90 could be hollow and adaptable to be filled with sand or water.

The left rigid member 80 is comprised of upper portion 20, opening 21, curved portion 22, and straight portion 23. The right rigid member is similarly comprised of upper portion 24, opening 25, curved portion 26, and straight portion 27. The left rigid member 80 also has openings 30, 32, and 34. The right rigid member 82 has similar openings 40, 42, and 44.

The base 90 is comprised of top section 90a and bottom section 90b. The base 90 has openings 60, 62, and 64 which go through both sections 90a and 90b. The protrusions 70–76 are rounded at the bottom such as shown for protrusion 70, i.e. rounded portion 70a. The protrusions 70–76 may be nails that are driven through the base sections 90a and 90b and which are thereafter rounded off. The protrusions 70–76 may be attached to the base 90 is some other manner such as by gluing. The protrusions 70–76 may be any rust proof material such as aluminum.

Figure 2:
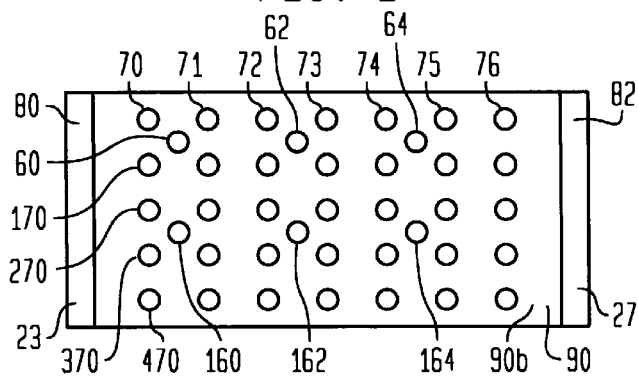
FIG. 2 shows a bottom view of the apparatus of FIG. 1.

FIG. 2 shows a bottom view of the underwater sensing apparatus 10 of FIG. 1. The bottom of straight portion 23 of the left rigid member 80 and the bottom of straight portion 27 of the right rigid member 82 are shown. Openings 60, 62, and 64 and additional openings 160, 162, and 164 in the base 90 are shown for allowing water to pass through. Protrusions 70–76, and additional rows of protrusions including rows starting with protrusions 170, 270, 370, and 470. Each protrusion is preferably the same or substantially similar.

FIG. 3 shows a top view of the base 90 without the other components of the apparatus 10. The openings 60, 62, and 64, as well as openings 160, 162, and 164 can be seen.

FIG. 4 shows a side view of the left rigid member 80 of the apparatus 10 of FIG. 1. Starting from the topmost point T, there is a curve C1 which goes to the left of point T. There is also a curve C2 which goes to the right of point T. The curvature for the curve C1 is substantially less than the curvature for the curve C2. This is done so that a comfortable flat grip area can be formed, to provide better handling and less weight. A user would grip the region where the curve C1 is. The portion 20 along with the curve C1 and the opening 21 forms a first handle. A second handle is formed by the portion 24 with a curve preferably exactly the same as C1 and the opening 25. The FIG. 4 view also shows the openings 30, 32, and 34 as well as additional openings 132 and 134. The FIG. 4 view also shows various the portions of the left rigid member 80, including top portion 20, opening 21, curved portion 22, and straight portion 23.

In operation, a user would grip his right hand on curve C1 of the left rigid member 80 so that his thumb points up towards portion 20. Similarly the user would grip his left hand on a curve exactly the same as curve C1 on the right rigid member 82 so that his thumb points up towards a portion 24. The user would in essence be standing behind the apparatus 10 in FIG. 1 and looking out of the page of FIG. 1.

A user would pick up the apparatus 10, by the first and second handles, and place it into shallow water, where for example, clams are generally known to be located. The apparatus 10 is placed in uprights, i.e. the base 90 is placed in the water first. As the base 90 is placed in the water, water flows into openings 60, 62, and 64, and 160, 162, and 164 allowing the base 90 to sink more easily. The base 90 is also preferably more densely weighted than the rigid members 80 and 82 allowing the apparatus 10 to sink more easily. Eventually the base 90 sinks far enough into the water so that the protrusions 70–76, and other rows (starting with 170, 270, 370, and 470) hit a clam bed. All of the protrusions are preferably rigid, and can be nails for example. When a protrusion such as protrusion 70 hits a clam, there will be a clicking sound and a user will thus know where the clams are. The user can then pick the clams up with his hands or use a net.

Other embodiments in accordance with the present invention are possible where the shape of the embodiment differs from the shape of the apparatus 10.

I claim:

1. A hand held apparatus for sensing objects underwater comprised of:

a first handle;

a base attached to the first handle;

a first rigid member connecting the base to the first handle, said base and said first rigid member each having a plurality of holes which allow water to pass through;

a plurality of protrusions attached to the base and protruding from the base, each of the plurality of protrusions being an elongated member having a length; and wherein the base is comprised of a bottom surface and each of the plurality of protrusions extends outward substantially perpendicularly from the bottom surface of the base in the direction of each protrusion's length.

2. The apparatus of claim 1 further comprised of:

a second handle;

the base attached to the second handle.

3. The apparatus of claim 2 and further wherein:

the second handle is part of a second rigid member.

4. The apparatus of claim 3 wherein:

the second rigid member is elongated and has a top and a bottom;

and the second handle is at the top of the second rigid member and the base is connected to the bottom of the second rigid member.

5. The apparatus of claim 2 wherein:

the second handle has an outer shape which is comprised of a first and a second curve;

the first curve having a substantially lesser curvature than the second curve, wherein the first curve is preferably held onto by a person using the apparatus.

6. The apparatus of claim 1 and further wherein:

the first handle is part of a first rigid member.

7. The apparatus of claim 6 further comprised of:

a second handle;

the base attached to the second handle;

wherein the second handle is part of a second rigid member.

8. The apparatus of claim 7 wherein:

the second rigid member is elongated and has a top and a bottom;

and the second handle is at the top of the second rigid member and the base is connected to the bottom of the second rigid member.

9. The apparatus of claim 8 and wherein:

the base is more densely weighted than the first rigid member;

and the base is more densely weighted than the second rigid member.

10. The apparatus of claim 8 and wherein:

the first and second rigid members have a plurality of openings which allow water to pass through.

11. The apparatus of claim 7 wherein:

the first handle has an outer shape which is comprised of a first and a second curve;

the first curve having a substantially lesser curvature than the second curve, wherein the first curve is preferably held onto by a person using the apparatus.

12. The apparatus of claim 11 wherein:

the second handle has an outer shape which is comprised of a first and a second curve;

the first curve having a substantially lesser curvature than the second curve, wherein the first curve is preferably held onto by a person using the apparatus.

13. The apparatus of claim 6 wherein:

the first rigid member is elongated and has a top and a bottom;

and the first handle is at the top of the first rigid member and the base is connected to the bottom of the first rigid member.

14. The apparatus of claim 13 and wherein:

the base is more densely weighted than the first rigid member.

15. The apparatus of claim 1 and wherein:

the base has a plurality of openings which allow water to pass through.

16. The apparatus of claim 1 wherein the protrusions are rounded at the bottom.

17. The apparatus of claim 1 wherein:

the first handle has an outer shape which is comprised of a first and a second curve;

the first curve having a substantially lesser curvature than the second curve, wherein the first curve is preferably held onto by a person using the apparatus.

18. A hand held apparatus for sensing objects underwater comprised of:

a first handle;

a base attached to the first handle;

a plurality of protrusions attached to the base and protruding from the base;

wherein the first handle is part of a first rigid member;

wherein the first rigid member is elongated and has a top and a bottom;

wherein the first handle is at the top of the first rigid member and the base is connected to the bottom of the first rigid member, said base and said first rigid member each having a plurality of holes which allow water to pass through;

and wherein the base is more densely weighted than the first rigid member.

19. A hand held apparatus for sensing objects underwater comprised of:

a first handle, a base attached to the first handle;

a plurality of protrusions attached to the base and protruding from the base;

wherein the first handle is part of a first rigid member, said base and said first rigid member each having a plurality of holes which allow water to pass through;

further comprised of a second handle, the base attached to the second handle;

wherein the second handle is part of a second rigid member;

wherein the second rigid member is elongated and has a top and a bottom;

wherein the second handle is at the top of the second rigid member and the base is connected to the bottom of the second rigid member;

wherein the base is more densely weighted than the first rigid member.

20. A method using a hand held apparatus for sensing objects underwater comprised of the steps of:

holding a first handle of a sensing device in one hand;

holding a second handle of a sensing device in another hand;

wherein the first handle and the second handle are attached to a base;

wherein the base has a plurality of protrusions attached to the base and protruding from the base, each of the plurality of protrusions being an elongated member having a length;

wherein the base is comprised of a bottom surface and each of the plurality of protrusions extends outward substantially perpendicularly from the bottom surface of the base in the direction of each protrusion's length;

and the method further comprises placing the base and the protrusions into water and hitting objects in the water with the protrusions in order to sense them.

* * * * *